(12) United States Patent
Eatough et al.

(10) Patent No.: US 7,664,034 B1
(45) Date of Patent: Feb. 16, 2010

(54) SYSTEMS AND METHODS FOR COLLECTIVE BANDWIDTH THROTTLING

(75) Inventors: David A. Eatough, Herriman, UT (US); Gregory P. Olsen, Lindon, UT (US); Paul B. Hillyard, Lindon, UT (US)

(73) Assignee: LANDesk Software, Inc., South Jordan, UT (US)

( * ) Notice: Subject to any disclaimer, the term of this patent is extended or adjusted under 35 U.S.C. 154(b) by 703 days.

(21) Appl. No.: 11/257,257

(22) Filed: Oct. 24, 2005

(51) Int. Cl.
*G01R 31/08* (2006.01)
(52) U.S. Cl. .................................... 370/235
(58) Field of Classification Search ............ 370/229, 370/235, 236.1, 468, 465, 477
See application file for complete search history.

(56) References Cited

U.S. PATENT DOCUMENTS

| | | | |
|---|---|---|---|
| 6,222,856 B1 | 4/2001 | Krishnan et al. | |
| 7,020,162 B2 * | 3/2006 | Iwasaki et al. | 370/468 |
| 2002/0110084 A1 | 8/2002 | Butt et al. | |
| 2003/0043741 A1 * | 3/2003 | Mukai et al. | 370/229 |
| 2005/0125563 A1 * | 6/2005 | Douglas | 709/250 |
| 2008/0084822 A1 * | 4/2008 | Sagfors et al. | 370/235 |
| 2008/0253394 A1 * | 10/2008 | Spinar et al. | 370/468 |

* cited by examiner

*Primary Examiner*—Kwang B Yao
*Assistant Examiner*—Tung Q Tran
(74) *Attorney, Agent, or Firm*—Austin Rapp & Hardman

(57) ABSTRACT

In an exemplary method, a computer system connects to a computer network that comprises one or more other computer systems. The computer system communicates with a remote system that is in electronic communication with the computer network via a communication link. The computer system coordinates its use of the communication link with the one or more other computer systems' use of the communication link such that a total bandwidth used by computer systems in the computer network does not exceed a defined maximum value.

20 Claims, 5 Drawing Sheets

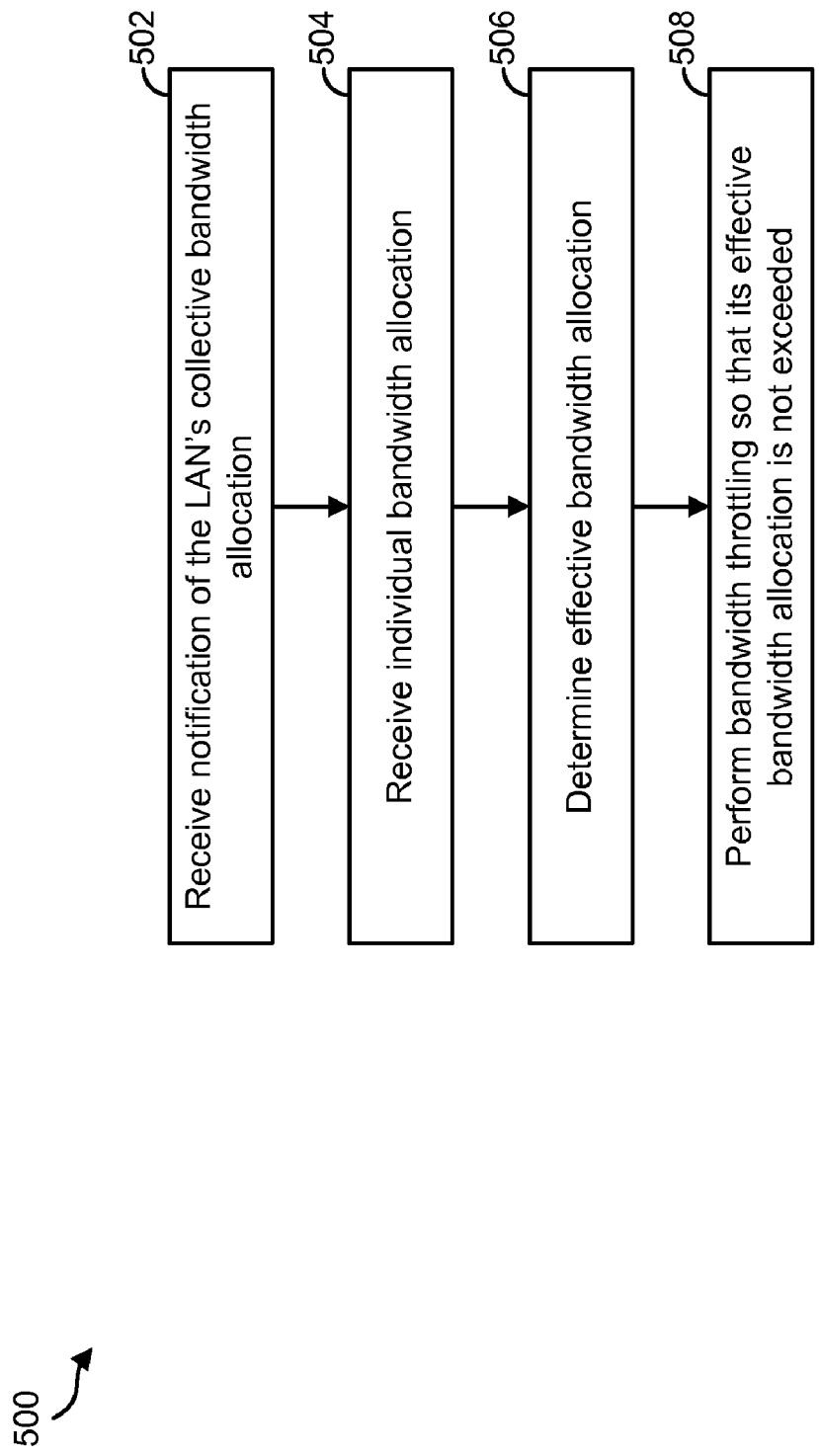

SYSTEMS AND METHODS FOR COLLECTIVE BANDWIDTH THROTTLING

TECHNICAL FIELD

The present invention relates generally to computers and computer-related technology. More specifically, the present invention relates to systems and methods for collective bandwidth throttling.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new computer hardware and/or software, or fixing problems with existing systems, may cause down-time during which the business or individual operates at a diminished level. Most individuals and businesses try to minimize computer problems so as to avoid down-time.

When a business or individual is trying to decide whether to make a change to a computer system, the concern about down-time may outweigh the cost of the installation or change in influencing the decision. The professional computer service industry which carries out and supports installations and upgrades has been rapidly expanding. However, even with such computer professional support, the threat of such down-time coupled with the costs of such professional services is a concern.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 5 illustrates an exemplary method that may be performed by each of the clients in the LAN according to an embodiment.

DETAILED DESCRIPTION

Figure 1:
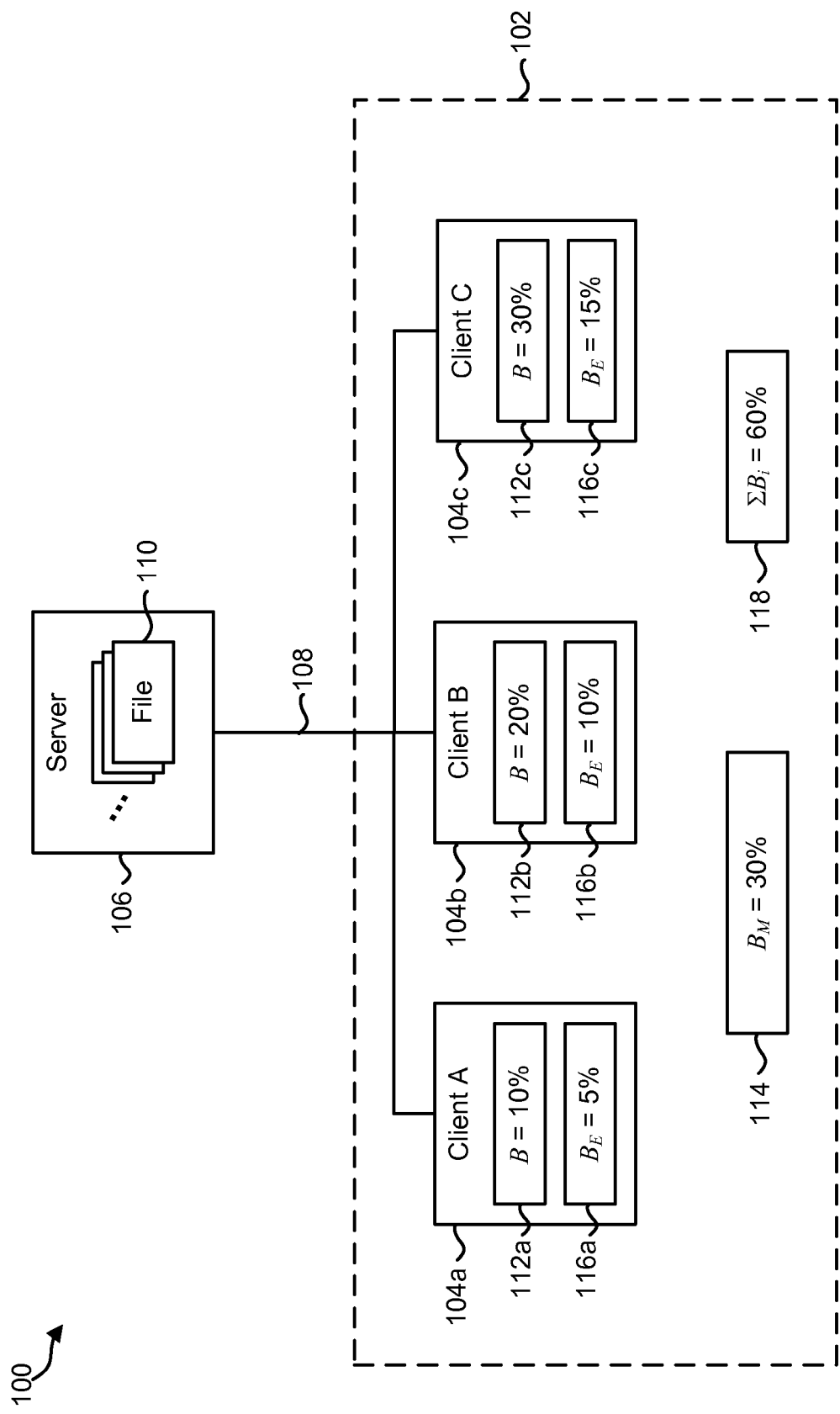
FIG. 1 illustrates the operation of a system that is configured according to an embodiment, the system including clients in a LAN that are in electronic communication with a server via a communication link.

A method for collective bandwidth throttling is disclosed. In accordance with the method, a computer system connects to a computer network that comprises one or more other computer systems. The computer system communicates with a remote system that is in electronic communication with the computer network via a communication link. The computer system coordinates its use of the communication link with the one or more other computer systems' use of the communication link such that a total bandwidth used by computer systems in the computer network does not exceed a defined maximum value. This may involve determining an effective bandwidth allocation for the computer system.

The computer system may be a client that is connected to a local area network. The communication link may be a wide area network link. The client may download one or more files from a server via the wide area network link.

The computer system may determine its effective bandwidth allocation whenever it becomes aware of a change in the bandwidth usage of the communication link. Alternatively, the computer system may periodically determine its effective bandwidth allocation.

The step of determining the effective bandwidth allocation may involve determining a potential bandwidth use of the communication link by the computer systems in a computer network that are presently using the communication link. Determining the potential bandwidth use may involve notifying the one or more other computer systems whenever there is a change to the computer system's use of the communication link.

A computer system that is configured to implement the method described above is also disclosed. The computer system includes a processor and memory in electronic communication with the processor. Instructions are stored in the memory. The instructions are executable to implement the method described above. A computer-readable medium comprising executable instructions for implementing the method described above is also disclosed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates the operation of a system 100 that is configured according to an embodiment. The system includes a local area network (LAN) 102. The LAN 102 includes a number of client computer systems 104, namely client A 104a, client B 104b, and client C 104c. The clients 104 in the LAN 102 are in electronic communication with a server 106 via a communication link 108. The server 106 is not part of the LAN 102. The communication link 108 may be a wide area network (WAN) link. The clients 104 in the LAN 102 may use the communication link 108 to communicate with the server 106. For example, the clients 104 in the LAN 102 may use the communication link 108 to download one or more files 110 from the server 106. It is also possible for the client A 104a, client B 104b, and client C 104c to be accessing resources from multiple servers (not shown) over the communication link 108.

It is generally desirable to limit the clients' 104 use of the communication link 108 to some extent, so that the communication link 108 does not become congested. To help accomplish this, each client 104 in the LAN 102 may be assigned an individual bandwidth allocation 112, i.e., an upper limit on the amount of the bandwidth of the communication link 108 that the client 104 is allowed to use, individually, at a given time. Each client 104 may then perform bandwidth throttling so that it does not exceed its individual bandwidth allocation 112. The term "bandwidth throttling" refers to any of numerous techniques for limiting the amount of the bandwidth of the communication link 108 that a particular client 104 uses at a given time. The clients 104 may be assigned their individual bandwidth allocations 112 by a system administrator for the LAN 102.

Even if each client 104 in the LAN 102 stays within its individual bandwidth allocation 112, however, this may not prevent congestion on the communication link 108. Several of the clients 104 in the LAN 102 may be using the communication link 108 simultaneously. If each client 104 is using its entire bandwidth allocation 112, this may be enough to cause congestion on the communication link 108. For example, consider the situation where all of the clients 104 in the LAN 102 perform bandwidth throttling so that no single client 104 uses more than 10% of the bandwidth of the communication link 108. If there are ten clients 104 that are using the communication link 108, they may collectively try to use a total of 100% of the communication link, thereby potentially overwhelming the connection.

To address this issue, the system 100 is configured for collective bandwidth throttling, i.e., for limiting how much of the bandwidth of the communication link 108 that is used, collectively, by all of the clients 104 in the LAN 102. In the illustrated embodiment, each LAN 102 coordinates its use of the communication link 108 with the other clients' 104 use of the communication link 108 so that the total bandwidth that is used by the clients 104 in the LAN 102 does not exceed a defined maximum value.

The LAN 102 as a whole is assigned a collective bandwidth allocation 114. The collective bandwidth allocation 114 for the LAN 102 is the maximum amount of the bandwidth of the communication link 108 that all of the clients 104 in the LAN 102, collectively, are allowed to use. The collective bandwidth allocation 114 may be assigned by a system administrator for the LAN 102. Alternatively, each client 104 may determine the collective bandwidth allocation 114 for the LAN 102 by setting it equal to the largest individual bandwidth allocation 112 of any of the clients 104 in the LAN 102.

In addition to being assigned an individual bandwidth allocation 112, each client 104 in the LAN 102 determines its effective bandwidth allocation 116. The effective bandwidth allocation 116 for a particular client 104 is the maximum amount of the bandwidth of the communication link 108 that the client 104, individually, is allowed to use so that neither the client's 104 individual bandwidth allocation 112 nor the LAN's 102 collective bandwidth allocation 112 is exceeded. Accordingly, the effective bandwidth allocation 116 for a particular client 104 may be less than or equal to the client's 104 individual bandwidth allocation 112. The effective bandwidth allocation 116 for a particular client 104 may be less than the client's 104 individual bandwidth allocation 112, for example, if there are a number of other clients 104 in the LAN 102 that are using the communication link 108.

In the illustrated embodiment, the effective bandwidth allocation 116 of a particular client 104 depends on the client's 104 individual bandwidth allocation 112, the collective bandwidth allocation 114 of the LAN 102, and the potential bandwidth use 118 of the clients 104 in the LAN 102 that are presently using the communication link 108. The potential bandwidth use 118 is the sum of the individual bandwidth allocations 112 of all of the clients 104 that are presently using the communication link 108. Thus, the potential bandwidth use 118 varies depending on the extent to which the clients 104 in the LAN 102 are using the communication link 108.

The effective bandwidth allocation 116 of a particular client 104 may be expressed mathematically as:

$$B_E = \frac{B_M}{\Sigma B_i} \times B \quad (1)$$

In equation (1), the term $B_E$ is the effective bandwidth allocation 116 of the client 104. The term $B_M$ is the collective bandwidth allocation 114 of the LAN 102. The term B is the individual bandwidth allocation 112 of the client 104. The term $\Sigma B_i$ is the potential bandwidth use 118 of the clients 104 in the LAN 102 that are presently using the communication link 108.

Once a client 104 has calculated its effective bandwidth allocation 116, then it performs bandwidth throttling so that it does not exceed its effective bandwidth allocation 116. Bandwidth throttling may be performed in a variety of ways. For example, a simple throttling mechanism may be used where sleeps are proportional to the amount of time it takes to download a piece of data.

An example which demonstrates the operation of the system 100 shown in FIG. 1 will now be discussed. In the illustrated example, the LAN 102 is assigned a collective bandwidth allocation 114 ($B_M$) of 30%. Each client 104 is assigned an individual bandwidth allocation 112 (B). Client A 104a is assigned an individual bandwidth allocation 112a of 10%. Client B 104b is assigned an individual bandwidth allocation 112b of 20%. Client C 104c is assigned an individual bandwidth allocation 112c of 30%.

Suppose that at some point in time each client 104 is using the communication link 108 to download file(s) 110 from the server 106. As indicated above, the potential bandwidth use 118 is the sum of the individual bandwidth allocations 112 of all of the clients 104 that are presently using the communication link 108. Because client A 104a, client B 104b, and client C 104c are each using the communication link 108, the potential bandwidth use 118 ($\Sigma B_i$) at this point in time is 10%+20%+30%=60%.

Each client 104 determines its effective bandwidth allocation 116 ($B_E$). The effective bandwidth allocation 116a for client A 104a is $$\frac{30\%}{60\%} \times 10\% = 5\%.$$

The effective bandwidth allocation 116b for client B 104b is $$\frac{30\%}{60\%} \times 20\% = 10\%.$$

The effective bandwidth allocation 116c for client C 104c is $$\frac{30\%}{60\%} \times 30\% = 15\%.$$

As the clients 104 are downloading files 110 from the server 106, each client 104 performs bandwidth throttling so that it does not use more than its effective bandwidth allocation 116. In particular, client A 104a performs bandwidth throttling so that it does not use more than 5% of the bandwidth of the communication link 108. Client B 104b performs bandwidth throttling so that it does not use more than 10% of the bandwidth of the communication link 108. Client C performs bandwidth throttling so that it does not use more than 15% of the bandwidth of the communication link 108. Accordingly, the total bandwidth used by all of the clients 104 in the LAN 102 does not exceed 5%+10%+15%=30%, which is the LAN's 102 collective bandwidth allocation 114.

As this example illustrates, when the clients 104 determine their effective bandwidth allocations 116, the clients 104 may maintain their assigned proportions relative to one another. In particular, in this example the initial bandwidth allocation 112a of client A 104a (10%) is one-half as much as the initial bandwidth allocation 112b of client B 104b (20%), and one-third as much as the initial bandwidth allocation 112c of client C 104c (30%). Likewise, the effective bandwidth allocation 116a of client A 104a (5%) is one-half as much as the effective bandwidth allocation 116b of client B 104b (10%), and one-third as much as the effective bandwidth allocation 116c of client C 104c (15%).

The system 100 shown in FIG. 1 is configured to limit how much of the bandwidth of the communication link 108 that is used, collectively, by all of the clients 104 in the LAN 102. Some other techniques have been used to limit the total bandwidth that is used by all of the clients 104 in the LAN 102. However, in known implementations the clients in the LAN can only access the communication link through a proxy server, which implements a bandwidth-limiting policy. Advantageously, the system 100 shown in FIG. 1 is able to achieve collective bandwidth throttling without the need for such a centralized authority.

Figure 2:
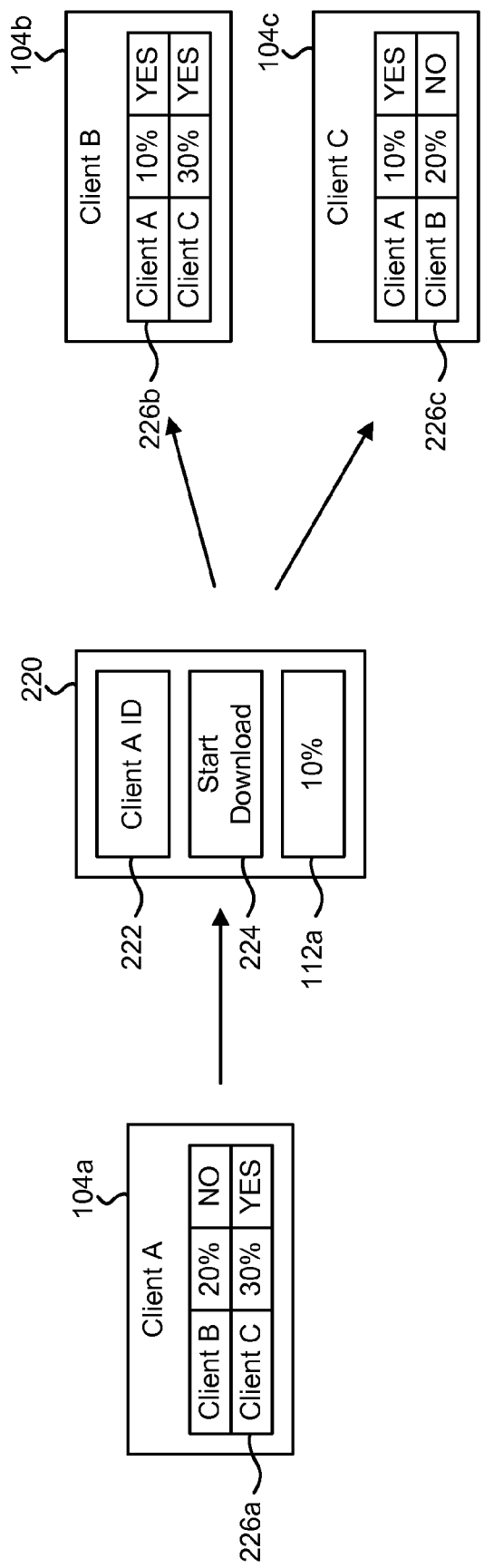
FIG. 2 illustrates an exemplary way that a client in the LAN may determine the potential bandwidth use of the clients in the LAN that are presently using the communication link according to an embodiment.

As indicated above, the effective bandwidth allocation 116 of a particular client 104 depends on the potential bandwidth use 118 of the clients 104 in the LAN 102 that are presently using the communication link 108. In some embodiments, each client 104 in the LAN 102 determines the potential bandwidth use 118 based on information that it receives from the other clients 104 in the LAN 102. FIG. 2 illustrates an exemplary way that a client 104 may determine the potential bandwidth use 118 according to an embodiment.

In the illustrated embodiment, each client 104 notifies the other clients 104 in the LAN 102 whenever there is a change to its use of the communication link 108 (e.g., when the client 104 begins and/or finishes downloading file(s) 110 from the server 106). For example, suppose that client A 104a is not currently using the communication link 108, but that client A 104a is going to start to use the communication link 108 to download file(s) from the server 106. Client A 104a sends a notification message 220 to the other clients 104 in the LAN 102, namely client B 104b and client C 104c. The notification message 220 includes an identifier 222 for client A 104a. The notification message 220 also includes an indication 224 of the change to client A's 104a use of the communication link 108, namely that client A 104a is going to start to use the communication link 108 to download file(s) 110 from the server 106. The notification message 220 may also include other information, such as the individual bandwidth allocation 112a for client A 104a.

Various communication technologies may be used by the clients 104 in the LAN 102 to send notification messages 220. For example, a multiple point protocol may be used. If a multiple point protocol is used, then a client 104 may send a single message that is received by multiple clients 104. An example of a multiple point protocol is multicast. Additional information about multicast technology is provided in U.S. Published Patent Application No. 2003/0187931, titled "Facilitating Resource Access Using Prioritized Multicast Responses To A Discovery Request," with inventors Gregory P. Olsen and David A. Eatough. This published patent application is hereby incorporated by reference in its entirety. Another example of a multiple point protocol is broadcast. Other communication technologies may also be used.

In the illustrated embodiment, each client 104 also keeps track of which clients 104 in the LAN 102 are presently using the communication link 108. This may be accomplished through the use of a list 226, which will be referred to as a tracking list 226. The tracking list 226 maintained by a particular client 104 may include an entry for all of the other clients in the LAN. For instance, in the illustrated example, the tracking list 226b maintained by client B 104b may include an entry for client A 104a and client C 104c.

The entry for a particular client 104 is associated with an indication of the individual bandwidth allocation 112 for that client 104. In addition, an activity flag is associated with each entry. If the activity flag for a particular client 104 is set to a first value (e.g., YES), then the client 104 is presently using the communication link 108. If the activity flag is set to a second value (e.g., NO), then the client 104 is not presently using the communication link 108.

When a client 104 receives a notification message 220, the client 104 updates its tracking list 226 based on the information contained in the notification message 220. In the illustrated example, in response to receiving the notification message 220 from client A 104a, client B 104b and client C 104c update their tracking lists 226b, 226c to reflect the fact that client A 104a is going to start to use the communication link 108 to download file(s) 110. This involves changing the activity flag for client A 104a to YES. Client B 104b and client C 104c may also record the individual bandwidth allocation 112a for client A 104a in their tracking lists 226, if they do not already have this information.

Each client 104 uses the information in its tracking list 226 to determine the potential bandwidth use 118. The potential bandwidth use 118 may be determined by taking the sum of the individual bandwidth allocations 112 of each client 104 whose activity flag is set to YES. In the illustrated example, the activity flags for client A 104a and client C 104c are both set to YES. The individual bandwidth allocation 112a for client A is 10%, and the individual bandwidth allocation 112c for client C is 30%. Accordingly, the potential bandwidth use 118 at this point in time is 10%+30%=40%.

Figure 3:
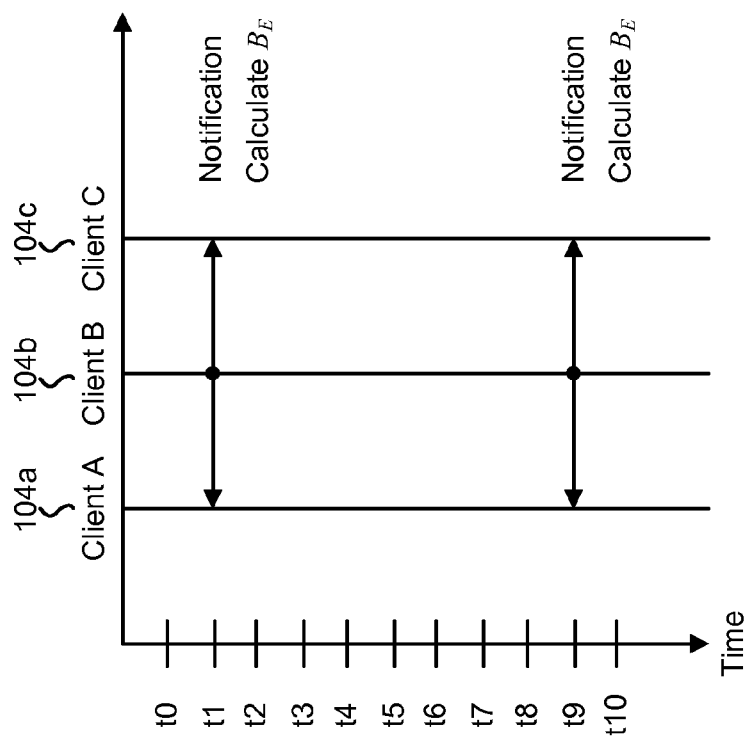
FIG. 3 illustrates an example showing how often the clients in the LAN may calculate their effective bandwidth allocations according to an embodiment.

As indicated above, the clients 104 in the LAN 102 calculate their effective bandwidth allocations 116. Typically, the clients 104 do this repeatedly, because their effective bandwidth allocations 116 depend on the clients' 104 use of the communication link 108, which may change from time to time. There are a variety of ways that the clients 104 may determine how often to calculate their effective bandwidth allocations 116. FIG. 3 illustrates an example showing how often the clients 104 in the LAN 102 may calculate their effective bandwidth allocations 116 according to an embodiment. In the illustrated embodiment, each client 104 calculates its effective bandwidth allocation 116 whenever it becomes aware of a change in the bandwidth usage of the communication link 108, i.e., whenever any of the clients 104 in the LAN 102 start or stop using the communication link 108.

In the illustrated example, at time t1 client B 104b notifies the other clients 104 in the LAN 102 of a change to its use of the communication link 108 (e.g., that client B 104b is going to start downloading a file 110 from the server 106). For example, client B 104b may send a notification message 220 to the other clients 104 in the LAN 102, as discussed above. In response, at time t2 all of the clients 104 in the LAN 102 calculate their effective bandwidth allocations 116. At time t9 client B 104b once again notifies the other clients 104 in the LAN 102 of a change to its use of the communication link 108 (e.g., that client B 104b has finished downloading the file 110 from the server 106). In response, at time t10 all of the clients 104 in the LAN 102 once again calculate their effective bandwidth allocations 116.

Figure 4:
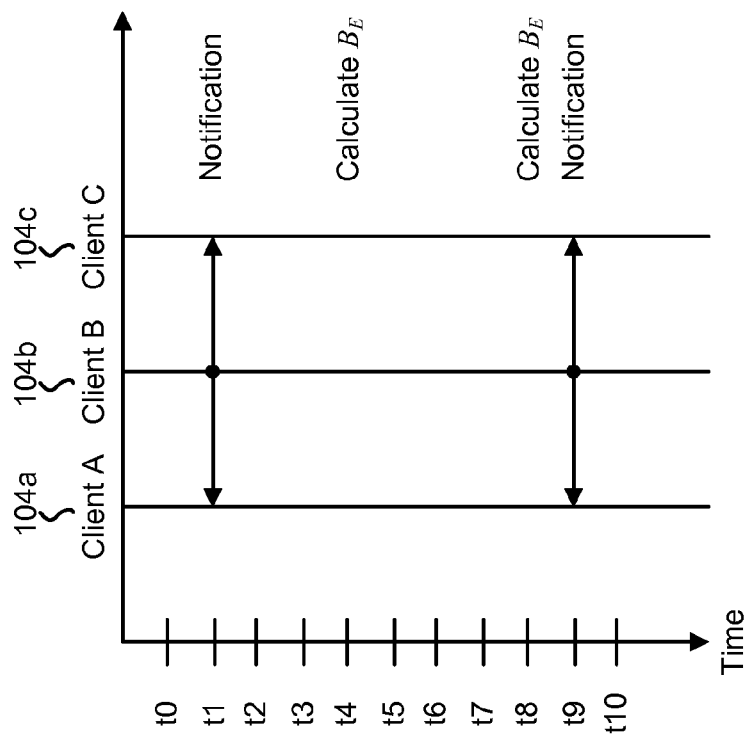
FIG. 4 illustrates another example showing how often the clients in the LAN may calculate their effective bandwidth allocations according to an embodiment.

FIG. 4 illustrates another example showing how often the clients 104 in the LAN 102 may calculate their effective bandwidth allocations 116 according to an embodiment. In the illustrated embodiment, each client 104 in the LAN 102 calculates its effective bandwidth allocation 116 on a periodic basis, regardless of what changes have occurred with respect to the bandwidth usage of the communication link 108. In this context, the term "periodic" means that each client 104 recalculates its effective bandwidth allocation 116 at regular intervals or in regular cycles.

In the illustrated example, each client 104 in the LAN 102 is configured to calculate its effective bandwidth allocation 116 every four time units (e.g., t4, t8, etc.). At time t1 client B 104b notifies the other clients 104 in the LAN 102 of a change to its use of the communication link 108. However, the clients 104 do not immediately calculate their effective bandwidth allocations 116. Rather, the clients 104 wait until time t4 to calculate their effective bandwidth allocations 116. The clients 104 calculate their effective bandwidth allocations 116 once again at time t8, even though there is not another change to the bandwidth usage of the communication link 108 until time t9.

FIG. 5 illustrates an exemplary method 500 that may be performed by each of the clients 104 in the LAN 102 according to an embodiment. Each client 104 receives 502 notification of a collective bandwidth allocation 114 that has been assigned to the LAN 102. Each client 104 also receives 504 notification of its individual bandwidth allocation 112.

Each client 104 in the LAN 102 determines 506 its effective bandwidth allocation 116. As discussed above, the effective bandwidth allocation 116 of a particular client 104 depends on the client's 104 individual bandwidth allocation 112, the collective bandwidth allocation 114 of the LAN 102, and the potential bandwidth use 118 of the clients 104 in the LAN 102 that are presently using the communication link 108. Each client 104 also performs 508 bandwidth throttling so that its use of the bandwidth of the communication link 108 does not exceed its effective bandwidth allocation 116.

Embodiments disclosed herein have been described with respect to clients in a LAN that use a communication link to download files from a server. However, embodiments are not limited in this regard. In fact, embodiments may be practiced in any kind of computer network that comprises a communication link to one or more other remote systems that are not part of the computer network. The techniques disclosed herein may be used to limit the amount of the bandwidth of the communication link that is used, collectively, by all of the computer systems in the computer network at any given time.

Figure 6:
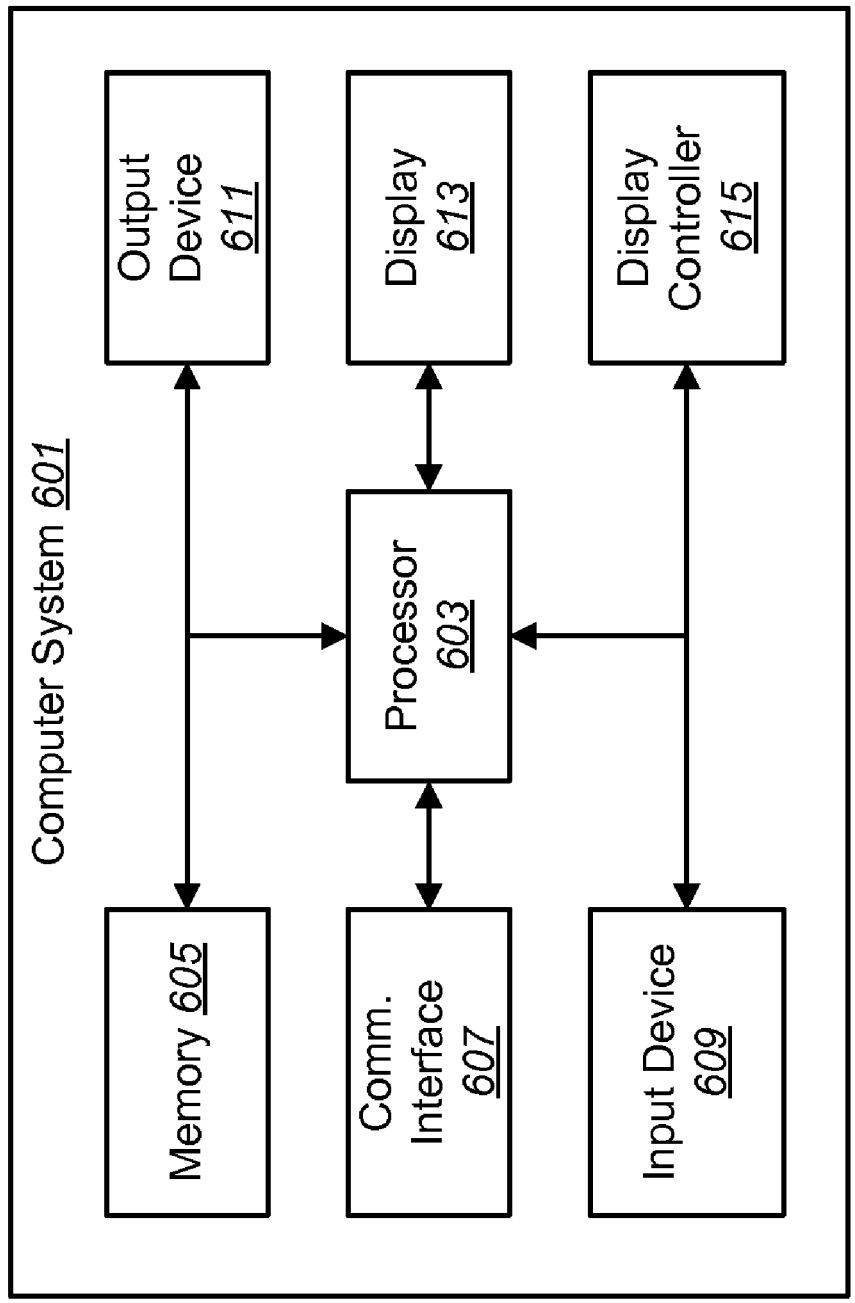
FIG. 6 is a block diagram illustrating the major hardware components typically utilized in a computer system.

FIG. 6 is a block diagram illustrating the major hardware components typically utilized in a computer system 601. The illustrated components may be located within the same physical structure or in separate housings or structures.

The computer system 601 includes a processor 603 and memory 605. The processor 603 controls the operation of the computer system 601 and may be embodied as a microprocessor, a microcontroller, a digital signal processor (DSP) or other device known in the art. The processor 603 typically performs logical and arithmetic operations based on program instructions stored within the memory 605.

As used herein, the term memory 605 is broadly defined as any electronic component capable of storing electronic information, and may be embodied as read only memory (ROM), random access memory (RAM), magnetic disk storage media, optical storage media, flash memory devices in RAM, on-board memory included with the processor 603, EPROM memory, EEPROM memory, registers, etc. The memory 605 typically stores program instructions and other types of data. The program instructions may be executed by the processor 603 to implement some or all of the methods disclosed herein.

The computer system 601 typically also includes one or more communication interfaces 607 for communicating with other electronic devices. The communication interfaces 607 may be based on wired communication technology, wireless communication technology, or both. Examples of different types of communication interfaces 607 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 601 typically also includes one or more input devices 609 and one or more output devices 611. Examples of different kinds of input devices 609 include a keyboard, mouse, microphone, remote control device, button, joystick, trackball, touchpad, lightpen, etc. Examples of different kinds of output devices 611 include a speaker, printer, etc. One specific type of output device which is typically included in a computer system is a display device 613. Display devices 613 used with embodiments disclosed herein may utilize any suitable image projection technology, such as a cathode ray tube (CRT), liquid crystal display (LCD), light-emitting diode (LED), gas plasma, electroluminescence, or the like. A display controller 615 may also be provided, for converting data stored in the memory 605 into text, graphics, and/or moving images (as appropriate) shown on the display device 613.

Of course, FIG. 6 illustrates only one possible configuration of a computer system 601. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for collective bandwidth throttling, the method being implemented by a computer system, the method comprising:
   connecting by the computer system to a computer network that comprises one or more other computer systems;
   communicating by the computer system with a remote system that is in electronic communication with the computer network via a communication link; and
   coordinating by the computer system the computer system's use of the communication link with the one or more other computer systems' use of the communication link such that a total bandwidth used by computer systems in the computer network does not exceed a defined maximum value, wherein coordinating the use of the communication link comprises determining an effective bandwidth allocation for the computer system, wherein the effective bandwidth allocation for the computer system is calculated according to:

$$B_E = (B_M \times B)/\Sigma B_i$$

wherein $B_M$ is the effective bandwidth allocation for the computer system, wherein B is an individual bandwidth allocation for the computer system, wherein Bi is a potential bandwidth use of the communication link by the computer systems in the computer network that are presently using the communication link, wherein BM is the defined maximum value, and wherein $B_M$, $B_M$, and B are $\geq 0$ and $\Sigma B_i \neq 0$.

2. The method of claim 1, wherein determining the potential bandwidth use comprises notifying the one or more other computer systems whenever there is a change to the computer system's use of the communication link.

3. A computer system that is configured for collective bandwidth throttling, the computer system comprising:

a processor;

memory in electronic communication with the processor;

instructions stored in the memory, the instructions being executable to:

connect to a computer network that comprises one or more other computer systems;

communicate with a remote system that is in electronic communication with the computer network via a communication link; and coordinate the computer system's use of the communication link with the one or more other computer systems' use of the communication link such that a total bandwidth used by computer systems in the computer network does not exceed a defined maximum value, wherein coordinating the use of the communication link comprises determining an effective bandwidth allocation for the computer system, and wherein the effective bandwidth allocation for the computer system is calculated according to:

$$B_E = (B_M \times B)/\Sigma B_i$$

wherein $B_M$ is the effective bandwidth allocation for the computer system, wherein B is an individual bandwidth allocation for the computer system, wherein Bi is a potential bandwidth use of the communication link by the computer systems in the computer network that are presently using the communication link, wherein BM is the defined maximum value, and wherein $B_M$, $B_M$, and B are $\geq 0$ and $\Sigma B_i \neq 0$.

4. A computer-readable medium for storing program data, wherein the program data comprises executable instructions to:

connect, by a computer system, to a computer network that comprises one or more other computer systems;

communicate with a remote system that is in electronic communication with the computer network via a communication link; and coordinate the computer system's use of the communication link with the one or more other computer systems' use of the communication link such that a total bandwidth used by computer systems in the computer network does not exceed a defined maximum value, wherein coordinating the use of the communication link comprises determining an effective bandwidth allocation for the computer system, wherein the effective bandwidth allocation for the computer system is calculated according to:

$$B_E = (B_M \times B)/\Sigma B_i$$

wherein $B_M$ is the effective bandwidth allocation for the computer system, wherein B is an individual bandwidth allocation for the computer system, wherein Bi is a potential bandwidth use of the communication link by the computer systems in the computer network that are presently using the communication link, wherein BM is the defined maximum value, and wherein $B_M$, $B_M$, and B are $\geq 0$ and $\Sigma B_i \neq 0$.

5. The method of claim 1, wherein the computer network is a local area network.

6. The method of claim 1, wherein the communication link is a wide area network link.

7. The method of claim 1, wherein the computer system is a client, wherein the remote system is a server, and wherein communicating with the server comprises downloading one or more files from the server.

8. The method of claim 1, wherein the computer system determines the effective bandwidth allocation whenever it becomes aware of a change in bandwidth usage of the communication link.

9. The method of claim 1, wherein the computer system periodically determines the effective bandwidth allocation.

10. The computer system of claim 3, wherein determining the potential bandwidth use comprises notifying the one or more other computer systems whenever there is a change to the computer system's use of the communication link.

11. The computer system of claim 3, wherein the computer network is a local area network.

12. The computer system of claim 3, wherein the communication link is a wide area network link.

13. The computer system of claim 3, wherein the computer system is a client, wherein the remote system is a server, and wherein communicating with the server comprises downloading one or more files from the server.

14. The computer system of claim 3, wherein the computer system determines the effective bandwidth allocation whenever it becomes aware of a change in bandwidth usage of the communication link.

15. The computer system of claim 3, wherein the computer system periodically determines the effective bandwidth allocation.

16. The computer-readable medium of claim 4, wherein determining the potential bandwidth use comprises notifying the one or more other computer systems whenever there is a change to the computer system's use of the communication link.

17. The computer-readable medium of claim 4, wherein the communication link is a wide area network link.

18. The computer-readable medium of claim 4, wherein the computer system is a client, wherein the remote system is a server, and wherein communicating with the server comprises downloading one or more files from the server.

19. The computer-readable medium of claim 4, wherein the computer system determines the effective bandwidth allocation whenever it becomes aware of a change in bandwidth usage of the communication link.

20. The computer-readable medium of claim 4, wherein the computer system periodically determines the effective bandwidth allocation.

* * * * *

UNITED STATES PATENT AND TRADEMARK OFFICE
CERTIFICATE OF CORRECTION

PATENT NO. : 7,664,034 B1  Page 1 of 1
APPLICATION NO. : 11/257257
DATED : February 16, 2010
INVENTOR(S) : Eatough et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1150 days.

Signed and Sealed this

Twenty-eighth Day of December, 2010

David J. Kappos
*Director of the United States Patent and Trademark Office*